United States Patent [19]

Asada et al.

[11] 4,080,210
[45] Mar. 21, 1978

[54] METHOD AND APPARATUS FOR PREPARING UNIFORMLY-SIZED FINE PARTICLES

[75] Inventors: Eiichi Asada; Hiromu Sasaki; Toshio Matsuhashi, all of Tokyo, Japan

[73] Assignee: Shoei Chemical Incorporated, Tokyo, Japan

[21] Appl. No.: 638,438

[22] Filed: Dec. 8, 1975

[51] Int. Cl.$^2$ .......................... G03C 1/02; C01G 5/00; B01F 9/00; B01J 7/00

[52] U.S. Cl. .................................. 96/94 R; 423/604; 23/286; 366/169

[58] Field of Search ............ 423/604, 23; 96/94, 96/114.7, 114.6; 427/168; 259/30, DIG. 10, DIG. 11, DIG. 12, DIG. 13; 23/286

[56] References Cited

U.S. PATENT DOCUMENTS

| | | | |
|---|---|---|---|
| 1,569,171 | 1/1926 | Brown | 23/286 |
| 1,896,020 | 1/1933 | Shimadzu | 23/286 |
| 3,043,570 | 7/1962 | Seiter | 259/30 |
| 3,098,756 | 7/1963 | Haracz | 427/168 |
| 3,415,650 | 12/1968 | Frame et al. | 96/114.7 |
| 3,782,954 | 1/1974 | Porter et al. | 96/94 R |
| 3,801,326 | 4/1974 | Claes | 96/94 R |

Primary Examiner—David Klein
Assistant Examiner—L. Falasco
Attorney, Agent, or Firm—Birch, Stewart, Kolasch and Birch

[57] ABSTRACT

A method and apparatus for preparing uniformly-sized particles wherein a first liquid reactant is chemically reacted with a second liquid reactant to form precipitated particles of substantially uniform particle size which comprises forming substantially uniformly-sized droplets of one of said reactants and directing said droplets against the falling flow of the other of said reactants.

8 Claims, 4 Drawing Figures

× 1

× 1

METHOD AND APPARATUS FOR PREPARING UNIFORMLY-SIZED FINE PARTICLES

BACKGROUND AND SUMMARY OF THE INVENTION

The present invention relates to an improved method and apparatus for preparing uniformly-sized particles.

The techniques of producing fine particles has been important for the industries which manufacture pigments, abrasives, photographic films, magnet recording tapes, powder metallurgical wares, electronic ceramic materials, and electric storage batteries. Among the characteristic properties of fine particles, particle sizes and their distribution affect the quality of the final products when the particles are used as a raw material. For example, silver bromide particles having a wide distribution of particle sizes cause an undesirable phenomenon known as pepper fog when they are used as a photographic material. When gamma ferric oxide particles which are used for magnetic recordings have a wide distribution of particle sizes, they cause an increasing ratio of noise intensity to signal one recorded on the tape. This leads to a poor recording characteristic for weak signals.

On the other hand, oxide particles used as a raw material for electronic ceramic or thick film resistors leads to high reproducibility, reliability, and potentiality of the components or devices when they possess a uniform particle size. As mentioned above, a narrow distribution of the particle size plays an important role for various material technologies.

There have been several attempts to prepare fine particles having a narrow particle size distribution, i.e., a substantially uniform size throughout. Exemplary of the improvements in silver halide precipitation techniques are U.S. Pat. No. 2,996,287, U.S. Pat. No. 3,415,650, and U.S. Pat. No. 3,782,954. Accordingly, it is an object of the present invention to overcome the above-mentioned disadvantages and to provide an improved method for preparing uniformly-sized fine particles.

Another object of the present invention is to provide an improved apparatus for preparing uniformly-sized fine particles.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, uniformly-sized particles can be produced in the following manner: a first reactant solution, for example, a silver salt, is poured into a cup disposed within a reaction vessel, said cup rotating at a high speed. The reactant solution introduced into the cup is ejected from the cup by the centrifugal force of the rotating cup, forming uniformly small droplets. A second reactant solution, for example, sodium hydroxide or potassium hydroxide, is uniformly introduced along the inside wall of the cylindrical reaction vessel. As a result, the above-mentioned centrifugal action small droplets of the first reactant solution are directed against the falling flow of the second solution and contact the second reactant solution flowing along the inside wall of the cylindrical reaction vessel causing a chemical reaction to occur in the form of precipitated particles, for example, silver oxide particles. The particles thus produced possess a substantially uniform particle size.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE DRAWINGS

Figure 1:
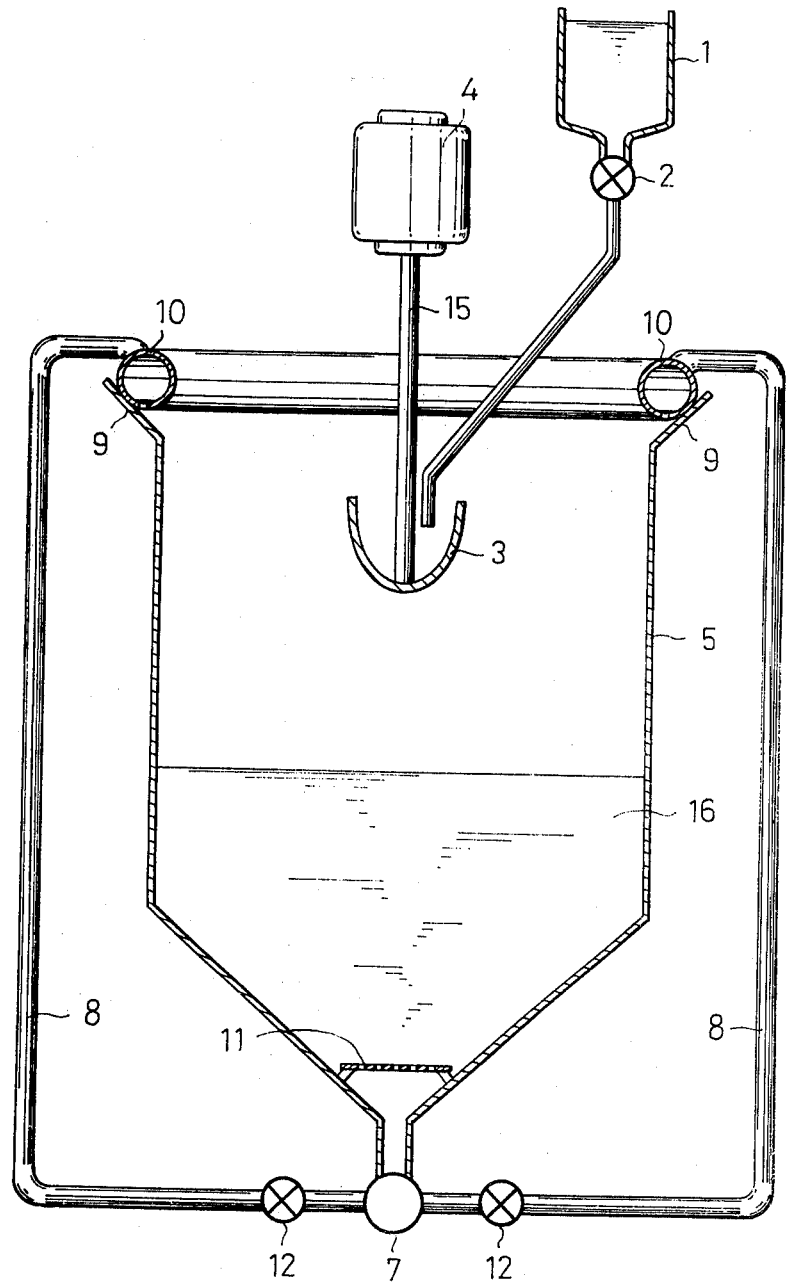
FIG. 1 is a side elevation, partially in section, of an apparatus utilized in the method of the present invention.
Figure 2:
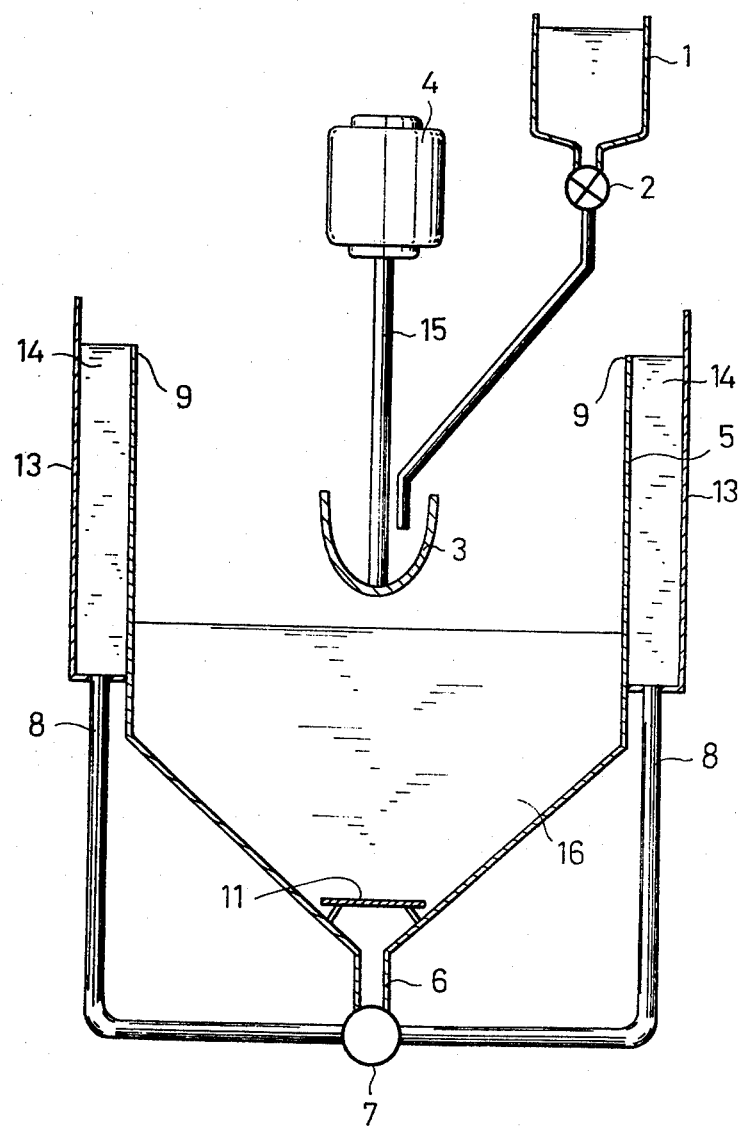
FIG. 2 is a side elevation, partially in section, of another embodiment of an apparatus utilized in the method of the present invention.

Referring now to FIGS. 1 and 2, it will be seen that a centrifugal small droplet forming device 3 is provided which includes a rotary mounted shaft 15 connected to an electric motor 4. The bottom of the reaction vessel 5 is provided with an outlet pipe 6 which is connected to a pump 7. The solution 16 is circulated through pipe 8 to the upper portion 9 of the reaction vessel 5 and through a showering pipe 10 provided with a plurality of holes. The holes in the showering pipe are effective in forming a uniform flow of the solution 16 on the inside wall of the reaction vessel. The reaction vessel 5 is also provided with a baffle plate 11 in its bottom portion for preventing vortex formation in the solution 16. Formation of a vortex is not desirable for forming a uniform flow of the solution 16 on the inside wall of the reaction vessel 5. The solution 1 is poured into the cup 3 at a desired rate with a controllable cock 2. The valve 12 between the pump 7 and the circulating pipe 8 is used for controlling the uniformity of the flowing solution on the inside wall of the reaction vessel.

In the embodiment of FIG. 2, the circulating flow of the solution 16 is stored in the tank 13 by the pipe 8. The periphery of the tank 13 is in a higher position than that of the reaction vessel 5. This difference in height produces an overflow of the solution 16 along the inside wall of the reaction vessel 5. The bottom of the tank 14 is connected to the pipe 8. Other details of the apparatus of FIG. 2 are identical with those of FIG. 1.

The present invention is further illustrated by reference to the following examples which are included for purposes of illustration only and are not intended to limit the scope of the present invention.

EXAMPLE 1

Figure 3:
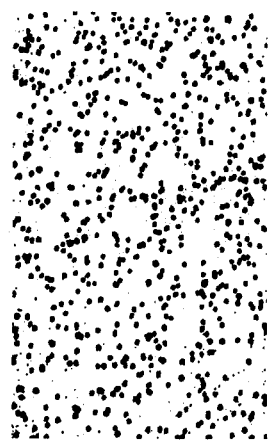
FIG. 3 shows the uniformity in size of the aqueous solution droplets; in this instance, an aqueous solution of a silver salt produced according to the present invention.
Figure 4:
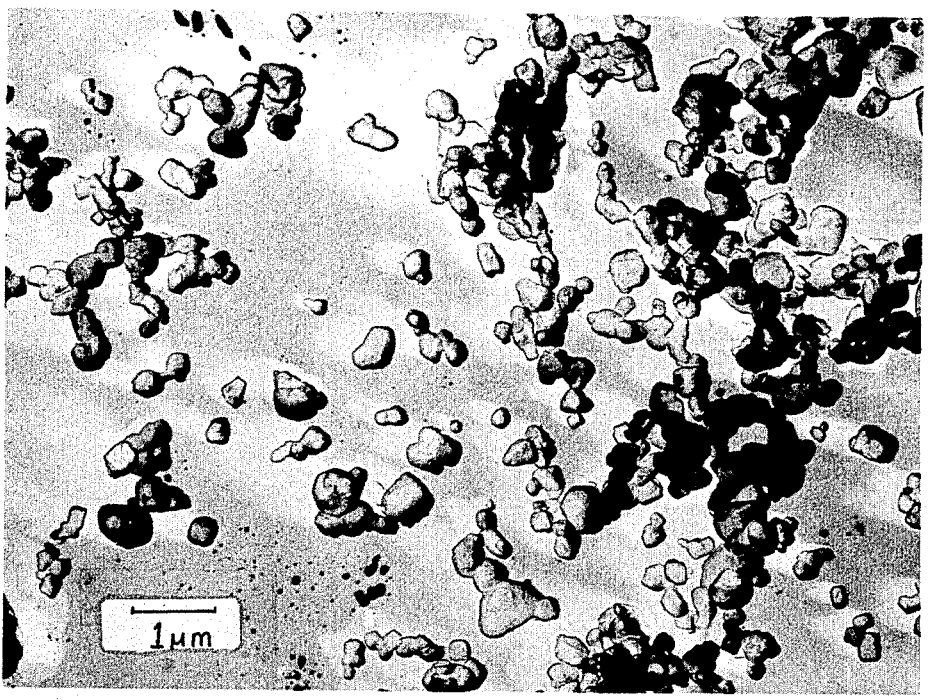
FIG. 4 shows the uniformity of the particle size of the particles produced by the process and apparatus of the present invention.

Silver oxide particles were prepared in the following manner using the device shown in FIG. 1. An aqueous solution of silver salt containing 680 grams of silver nitrate in a total volume of 2 liters of distilled water was stored in the solution supplier 1. The silver nitrate solution was poured into the cup 3 at a rate of approximately 100 cc per minute with a control valve 2. The cup was rotated at approximately 6000 rpm. An aqueous solution of sodium hydroxide containing 800 grams of sodium hydroxide in a total volume of 100 liters was stored in the reaction vessel 5. The sodium hydroxide solution was maintained at 6.5° C. After initiating the formation of a uniform flow of the sodium hydroxide solution on the inside wall of the reaction vessel 5, the cup 3 was rotated and then the silver nitrate solution was poured into the cup. The pH value of the solution 16 before and after the chemical reaction between the silver nitrate and the sodium hydroxide solution was 11.9 and 11.6, respectively. The temperature of the solution 16 after the chemical reaction was 7.0° C. A size distribution of the droplets of the silver nitrate solution ejected from the cup is shown in FIG. 3. Uniformity of the silver oxide particles produced was confirmed on the electronmicrographic picture as shown in FIG. 4. The silver oxide particles have a size distribution ranging from 0.3 m to 0.5 μm. The yield of silver oxide particles contained a silver content of 97.58% compared to that of the initially used silver nitrate.

EXAMPLE 2

Silver oxide particles were prepared in the following manner using the device shown in FIG. 2.

An aqueous solution of silver salt solution containing 1761 grams of silver nitrate in a total volume of 5.2 liters of distilled water was stored in the solution supplier 1. An aqueous solution of sodium hydroxide containing 2080 grams of sodium hydroxide in a total volume of 240 liters of distilled water was stored in the reaction vessel 5, and maintained at 15.0° C. After the formation of a uniform flow of the sodium hydroxide solution on the inside wall of the reaction vessel, the cup 3 was rotated at approximately 6000 rpm. Then the silver nitrate solution was poured into the rotating cup at a rate of approximately 100 cc per minute with a control valve 2. Many droplets of the silver nitrate solution are radially discharged from the rotating cup toward the surface of the sodium hydroxide solution flowing along the periphery of the reaction vessel. After the pouring of the silver nitrate solution is completed, the temperature of the sodium hydroxide solution containing already-formed silver oxide particles was at 16.8° C. The pH value of the solution 16 before and after the silver oxide formation reaction was 13.6 and 13.2, respectively. The flowing of the solution 16 on the inside wall of the reaction vessel was uniform throughout the precipitation reaction. The silver oxide particles obtained by the present method showed a size distribution ranging from 0.4 to 0.5 μm. The yield of the silver oxide particles was 99.5% with respect to the initially used amount of silver.

EXAMPLE 3

Silver oxide particles were prepared in the following manner using the device used in Example 1. An aqueous solution of silver nitrate containing 1761 grams of a silver salt in a total volume of 2.6 liters of distilled water was stored in a solution supplier 1. An aqueous solution of sodium hydroxide containing 2080 grams of sodium hydroxide in a total volume of 120 liters of distilled water was stored in the reaction vessel 5 and maintained at 15.2° C. Preparation of the silver oxide particles was carried out in almost the identical conditions of Example 1, except for the following changes. The silver nitrate solution was poured into the rotating cup at a rate of 65 cc per minute. The pH value of the solution 16 before and after the precipitation reaction was 14.2 and 14.0, respectively. The silver oxide particles obtained by the present method showed a size distribution ranging from 0.4 to 0.6 μm. The yield of the silver oxide particles was 95.8% with respect to the amount of silver initially used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

It is claimed:

1. A method of preparing uniformly-sized particles of silver oxide wherein a first solution of a soluble silver salt is chemically reacted with a second solution of a soluble hydroxide to form precipitated particles of silver oxide of substantially uniform particle size which comprises forming substantially uniformly-sized droplets of said first solution and directing said droplets against a uniform falling flow of said second solution.

2. The method of claim 1, wherein the droplets of said first solution are produced by centrifugal action.

3. The method of claim 2, wherein the particles of said silver oxide have a size of about 0.3 to 0.6 μm.

4. The method of claim 1, wherein said first solution of soluble silver salt is an aqueous solution of silver nitrate and said second solution of soluble hydroxide is selected from at least one member of the group consisting of an aqueous solution of sodium hydroxide and an aqueous solution of potassium hydroxide.

5. The method of claim 4, wherein the particles of said silver oxide have a size of about 0.3 to 0.6 μm.

6. A method of preparing uniformly-sized particles of silver oxide wherein a first solution of a soluble silver sale is chemically reacted with a second solution of a soluble hydroxide to form precipitated particles of silver oxide of substantially uniform particle size which comprises introducing a substantially uniform flow of said second solution along the inside surface of a container and introducing said first solution into a rotating receptacle centrally disposed within said container, said rotating receptacle ejecting uniformly-sized droplets of said first solution by centrifugal action into contact with the falling flow of said second solution flowing along the inside surface of said container.

7. The method of claim 6, wherein the rotation of said receptacle ejects said first solution in droplets of substantially uniform size.

8. The method of claim 7, wherein said first solution of a soluble silver salt is an aqueous solution of silver nitrate and a second solution of a soluble hydroxide is selected from at least one member of the group consisting of an aqueous solution of sodium hydroxide and an aqueous solution of potassium hydroxide.

* * * * *